United States Patent [19]

Marckwardt

[11] 4,193,117

[45] Mar. 11, 1980

[54] ELECTRONIC CORRELATOR

[75] Inventor: Werner Marckwardt, Jena-Lobeda, German Democratic Rep.

[73] Assignee: Jenoptik Jena G.m.b.H., Jena, German Democratic Rep.

[21] Appl. No.: 908,363

[22] Filed: May 22, 1978

[30] Foreign Application Priority Data

May 31, 1977 [DD] German Democratic Rep. ... 199212

[51] Int. Cl.² .................. G06F 15/34; G06G 7/19
[52] U.S. Cl. .................. 364/728; 250/558; 364/719
[58] Field of Search .................. 364/819–822, 364/604–607, 728; 250/558

[56] References Cited

U.S. PATENT DOCUMENTS

| 3,473,875 | 10/1969 | Bertram | 250/558 |
| 3,548,210 | 12/1970 | Chapelle et al. | 250/558 |
| 3,554,645 | 1/1971 | Bertram | 250/558 |
| 3,648,039 | 3/1972 | Kowalski | 364/820 |
| 4,041,293 | 8/1977 | Kihlberg | 364/819 |

*Primary Examiner*—Felix D. Gruber

[57] ABSTRACT

The invention concerns an electronic correlator for the evaluation of stereo-couples of photographs. Said electronic correlator comprises a normal correlator into which non-delayed signals are fed which in turn are derived from homologous points of each of the photographs of said stereo-couples. It further comprises an auto-correlator into which the image signals are fed non-delayed from the one photograph and delayed from the other photograph. A subtraction unit is connected to the normal correlator and to the auto-correlator. Furthermore two orthogonal correlators are provided into which the delayed and non-delayed image signals derived from the two photographs are fed crosswise delayed and non-delayed. The two orthogonal correlators are followed by a subtraction unit. By virtue of such an arrangement the trend inherent in the image signal functions to be correlated are taken into consideration and thus the quality of the image correlation is increased.

1 Claim, 1 Drawing Figure

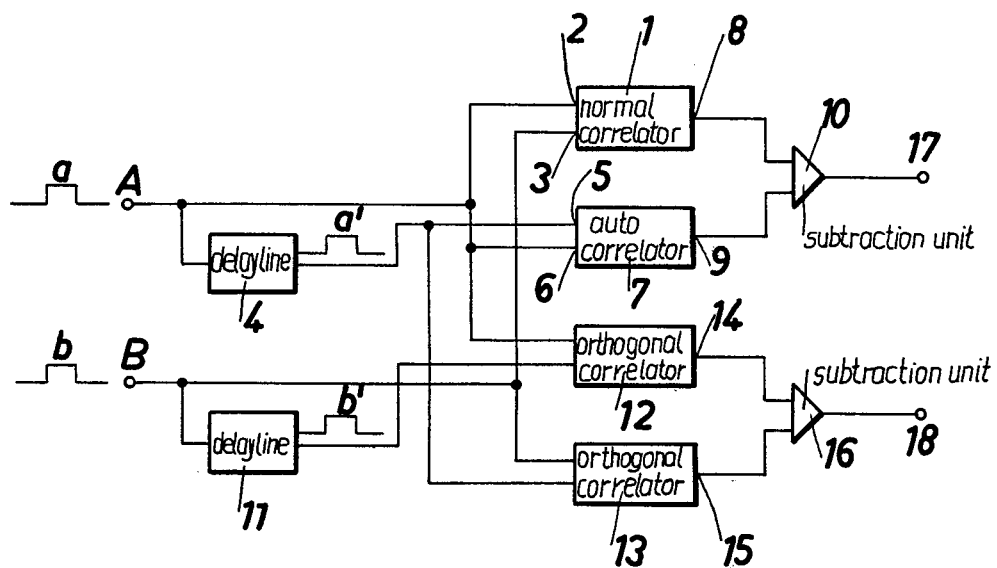

ELECTRONIC CORRELATOR

The invention concerns an electronic correlator which is used to correlate signals particularly derived from homologous image points of stereo-couples of photographs, in which the non-delayed electric signals which correspond to the respective image points are fed into a correlator. One non-delayed image signal out of a pair is fed crosswise with the delayed other image signal of said pair of image signals into two orthogonal correlators, which are coupled to a first subtraction unit. The inventive arrangement is applicable in units which require besides a correlation signal, an information about the reliability of said signal. In particular, it is used in photogrammetric automatic stereo plotters.

Electronic correlators are used to detect phase shifts between pulses which are derived from image points of stereo-couples of photographs. However, the correlator is not capable of examining all image points with respect to phase differences, since, with large-scale images, very often zones occur which lack contrast, as it is the case with fields, or extended water areas, or large objects, such as trees and buildings. Such zones or objects very often cause correlator failures. Therefore, the correlator unit is provided with a means which enables the detection of such failures. Said means mostly is a correlation quality signal. In other words, the correlator has the task even to detect image signals, at different amplitudes, when the phase difference exceeds the capturing range of the correlator.

Previous devices (DT-AS No. 1798389, DT-AS No. 1798390) employ a standard-type correlator to this purpose, which correlates the non-delayed image signals. The correlator provides a correlation quality signal as a function of the phase difference. When this signal falls short of or reaches a definite threshold value, a number of different operations start via respective switches, such as providing a correlation failure signal, a jump signal to a greater raster scale, or a signal for reducing the advance speed.

It is a disadvantage of such devices that the correlation quality signals produced by the standard-type or normal correlator are affected by the amplitudes of the image signals, that is, are trend signals. Hence, the threshold values depend on the contents of the image signals, which according to the set level of the threshold value, leads in some cases to too early or to a delayed information about any correlation failure. When the information is delivered too early, then the operation of the system is interrupted too often. At a delayed information the capturing range of the correlator is exceeded and the resulting phase differences result in serious errors in the correlation evaluation process.

It is an object of the present invention to obviate the above disadvantages. It is a further object of the present invention to provide, in an automatic stereo-plotter, an electronic correlator of improved precision for correlating the image signals derived from stereo-couples of photographs.

It is still a further object of the present invention to provide a correlator quality signal which considers the trend inherent in the image signal operations subject to correlation.

These and other objects are realised by an automatic correlator, which is provided in addition to a standard-type correlator, in that one of the image signals derived from one photograph of a stereo-couple is fed into said automatic correlator in a non-delayed and in a delayed form, and in that the standard-type correlator is connected to said automatic correlator via a second subtraction unit.

In order that the invention may be more readily understood reference is made to the accompanying drawings which illustrate diagrammatically and by way of example one embodiment thereof and where the FIGURE is a schematic view of an electronic correlator.

Electric signals a and b which correspond to the informations obtained from scanned image points of a stereo-couple of photographs (not shown) are fed into inputs A and B of an electronic correlator unit.

Both signals are applied non-delayed to the inputs 2 and 3 of a standard-type or normal correlator 1.

Furthermore, the signal a is also fed into a delay-line 4 to produce a delayed signal a' which is fed with the signal a into an automatic correlator unit 7 via inputs 5 and 6, respectively.

The output signals from an output 8 of the standard-type correlator 1 and from an output 9 of the automatic correlator unit 7 are fed into a subtraction unit 10. The non-delayed signal a and the signal b' delayed in a delay line 11 are fed into a first orthogonal correlator unit 12 and the delayed signal a' and the non-delayed signal b are fed into a second orthogonal correlator unit 13. The output signals from outputs 14 and 15 of the orthogonal correlator units 12 and 13, respectively, are fed into a subtraction unit 16.

The electric signals a and b which correspond to the image points of a stereo photograph are applied in a digital form to the inputs A,B.

The standard-type correlator 1 compares the two non-delayed signals a and b as to their identity. This can be achieved by use of an exclusive OR-circuit in combination with a negator (not shown). The respective output signals are integrated by a not shown R-C-member. The voltage at output 8 is indicative of the degree of identity between the two non-delayed signals. In analogy to the latter, the automatic correlator unit 7 compares the delayed and the non-delayed signals a and a' and the voltage at the output 9 is a measure of the automatic correlation of the non-delayed and delayed signal a and a'. Said voltage corresponds to the voltage which the standard-type correlator 1 would supply if the two input signals a and b were identical and the phase-shift between them corresponded to the delay time effected by the delay-line 4. The delay time has to be selected such that it corresponds to the capturing range of the orthogonal correlator units 12 and 13.

Since the signals a and b are almost identical, due to the corresponding homologous image points, the output voltage of the automatic correlator unit 7 is used as a reference signal under the condition that it is subject to the same trend as the standard-type correlator 1 voltage. The subtraction unit 10 compares both output voltages as follows. If the difference output voltage of the standard-type correlator 1 minus the output voltage of the automatic correlator unit 7 is positive then the correlation quality signal obtained is applicable. The difference can be displayed as correlation quality signal in a not shown display unit, which is connected to the output 17. When, however, the difference is zero or negative then the capturing range is exceeded.

In this case, a signal, indicating the correlation failure is produced.

The orthogonal correlator units 12, 13 serve to determine the sign of the phase differences between the two signals a and b, that is, they are indicative of the direction of the image point displacements.

Since they are well known devices they are not explained in detail.

The arrangement which is disclosed hereinabove for digital input signals can also be employed, when correspondingly adapted, for analog input signals.

Alternatively, the reference voltage can be derived from signal b automatically correlated to the delayed signal b'.

I claim:

1. An electronic correlator for correlating electric signals derived from homologous image points of stereo-couples of photographs, particularly for use in stereoplotters, comprising a correlator unit having two inputs and one output, an auto-correlator unit having two inputs and one output, two orthogonal correlator units having two inputs and one output, two delay-lines, and two subtraction units, said correlator unit receiving the non-delayed signals from one of said homologous image points of each photograph of said stereo-couple, said auto-correlator unit receiving at one of its outputs a non-delayed signal from the first of said photographs of the stereo-couple, the output of said correlator unit and the output of said auto-correlator unit being connected to one of said two subtraction units, the first of said orthogonal correlator units receiving at one of its inputs the non-delayed signal from the first photograph of said stereo-couple and being connected to the second of said delay lines via its other input for receiving the non-delayed signal from the second photograph of said stereo-couple, the second of said orthogonal correlator units receiving the non-delayed signal from the second photograph of said stereo-couples at one of its inputs, and being connected to the first of said delay lines via the other input, said other input receiving the delayed signal from the first photograph of said stereo-couple, the outputs of said two orthogonal correlator units being connected to the other of said two subtraction units.

* * * * *